US011353185B2

(12) United States Patent
Ocegueda Gallaga et al.

(10) Patent No.: US 11,353,185 B2
(45) Date of Patent: Jun. 7, 2022

(54) ELECTRIC LIGHTING SYSTEM AND COMPONENTS, AND CHARGING AND CONNECTION MECHANISMS THEREOF

(71) Applicants: Polygroup Limited (Macao Commercial Offshore), De Macau (MO); Yifeng Zhang, Xinxiang (CN); Shuangyi Lyu, Shenzhen (CN)

(72) Inventors: Victor Hugo Ocegueda Gallaga, Baja California (MX); Yifeng Zhang, Xinxiang (CN); Shuangyi Lyu, Shenzhen (CN)

(73) Assignee: Polygroup Limited (Macao Commercial Offshore), De Macau (MO)

( * ) Notice: Subject to any disclaimer, the term of this patent is extended or adjusted under 35 U.S.C. 154(b) by 0 days.

(21) Appl. No.: 16/967,575

(22) PCT Filed: Feb. 27, 2019

(86) PCT No.: PCT/US2019/019914
§ 371 (c)(1),
(2) Date: Aug. 5, 2020

(87) PCT Pub. No.: WO2019/169051
PCT Pub. Date: Sep. 6, 2019

(65) Prior Publication Data
US 2021/0239287 A1 Aug. 5, 2021

Related U.S. Application Data

(60) Provisional application No. 62/635,606, filed on Feb. 27, 2018.

(51) Int. Cl.
*F21S 10/04* (2006.01)
*F21S 9/02* (2006.01)
(Continued)

(52) U.S. Cl.
CPC .............. *F21S 10/043* (2013.01); *F21S 9/02* (2013.01); *F21V 19/0025* (2013.01);
(Continued)

(58) Field of Classification Search
CPC .. F21S 9/02; F21S 10/04; F21S 10/043; F21S 10/046; F21V 21/096; F21V 21/0965;
(Continued)

(56) References Cited

U.S. PATENT DOCUMENTS

| | | | | |
|---|---|---|---|---|
| 3,810,258 A | * | 5/1974 | Mathauser | H01R 13/6205 439/39 |
| 5,754,124 A | * | 5/1998 | Daggett | H02J 7/0042 340/908.1 |

(Continued)

OTHER PUBLICATIONS

Office Action for U.S. Appl. No. 17/125,450 dated Jul. 8, 2021, p. 10.

*Primary Examiner* — Jong-Suk (James) Lee
*Assistant Examiner* — James M Endo
(74) *Attorney, Agent, or Firm* — Finnegan, Henderson, Farabow, Garrett & Dunner LLP

(57) ABSTRACT

The disclosed systems and methods relate to electric lighting systems and charging and connection mechanisms thereof. In one example, an electric lighting system comprises a charger configured for electrical communication with a power source. The electric lighting system further comprises an electric light source removably couplable to, and configured for electrical communication with, the charger, the electric light source comprising a lighting element. The electric lighting system further comprises a light source holder removably couplable to the electric light source, wherein, when the electric light source is removably coupled to the light source holder, the electric light source and the light source holder share a central axis.

16 Claims, 12 Drawing Sheets

(51) Int. Cl.
*F21V 19/00* (2006.01)
*F21V 21/096* (2006.01)
*F21V 23/06* (2006.01)
*F21V 17/10* (2006.01)

(52) U.S. Cl.
CPC ............ *F21V 21/096* (2013.01); *F21V 23/06* (2013.01); *F21S 10/04* (2013.01); *F21V 17/105* (2013.01)

(58) Field of Classification Search
CPC .............. F21V 17/105; H01R 13/6205; H01R 13/7037; H01R 13/71; H01R 13/629; H01R 11/30; Y10S 439/919; H05B 47/19; H05B 47/155
See application file for complete search history.

(56) References Cited

U.S. PATENT DOCUMENTS

| | | | |
|---|---|---|---|
| 7,400,112 B2 | 7/2008 | Barbeau et al. | |
| 8,210,708 B2* | 7/2012 | Hau | F21S 6/001 362/183 |
| 9,228,704 B2 | 1/2016 | Andersen et al. | |
| 10,879,711 B2 | 12/2020 | Lollo et al. | |
| 10,941,913 B1 | 3/2021 | Robinson et al. | |
| 2005/0237737 A1 | 10/2005 | Kim | |
| 2005/0255718 A1* | 11/2005 | McLeish | H01R 13/6205 439/39 |
| 2005/0285538 A1* | 12/2005 | Jaworski | A61L 9/037 315/76 |
| 2006/0262525 A1* | 11/2006 | Barbeau | H02J 7/0042 362/157 |
| 2006/0263733 A1* | 11/2006 | Furner | F21V 35/00 431/292 |
| 2007/0177393 A1* | 8/2007 | Hirata | F21S 6/001 362/392 |
| 2007/0223217 A1* | 9/2007 | Hsu | F21S 9/02 362/183 |
| 2007/0291488 A1* | 12/2007 | Heathcock | H05B 47/19 362/276 |
| 2009/0059596 A1* | 3/2009 | Lederer | F21S 9/02 362/295 |
| 2009/0303702 A1* | 12/2009 | Ellis | F21V 23/04 362/183 |
| 2010/0124050 A1* | 5/2010 | Hau | H02J 7/0021 362/183 |
| 2010/0141153 A1* | 6/2010 | Recker | H05B 47/115 315/149 |
| 2011/0255272 A1* | 10/2011 | Privas | F21S 6/001 362/157 |
| 2011/0317403 A1* | 12/2011 | Fournier | H02J 7/00 362/183 |
| 2012/0147595 A1 | 6/2012 | Wang | |
| 2013/0148342 A1 | 6/2013 | Yang | |
| 2013/0295781 A1* | 11/2013 | Gualino | H01R 13/4538 439/39 |
| 2014/0042962 A1* | 2/2014 | Thompson | H02J 7/025 320/107 |
| 2014/0126187 A1* | 5/2014 | Bennett | F21L 2/00 362/183 |
| 2014/0293592 A1* | 10/2014 | Hopper | F21L 14/00 362/183 |
| 2015/0103520 A1* | 4/2015 | Fournier | F21S 9/02 362/190 |
| 2015/0233555 A1* | 8/2015 | Poon | F21S 9/02 362/569 |
| 2016/0013582 A1* | 1/2016 | Byrne | H01R 13/6205 439/39 |
| 2016/0105047 A1 | 4/2016 | Cui | |
| 2016/0305624 A1* | 10/2016 | Li | F21S 10/04 |
| 2017/0038020 A1 | 2/2017 | Patton et al. | |
| 2017/0093087 A1* | 3/2017 | Esmaeili | H01R 13/6205 |
| 2017/0164456 A1* | 6/2017 | Patton | F21V 17/10 |
| 2017/0214175 A1* | 7/2017 | Watkins | H01R 13/6205 |
| 2017/0276303 A1* | 9/2017 | Chen | F21V 23/0414 |
| 2017/0292686 A1* | 10/2017 | Fuller | H05B 45/20 |
| 2019/0056075 A1 | 2/2019 | Williams | |
| 2019/0123576 A1* | 4/2019 | Longo | F21V 23/04 |
| 2020/0408395 A1 | 12/2020 | Becker | |

* cited by examiner

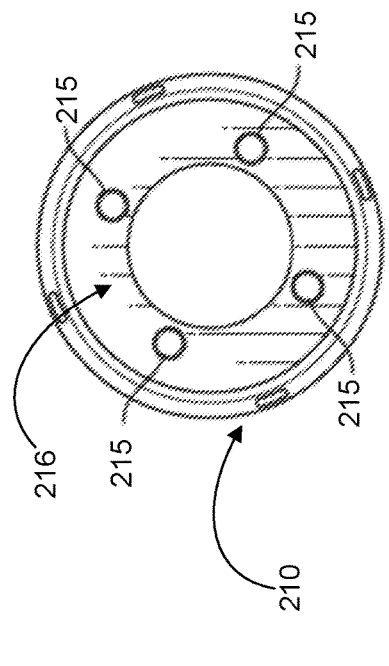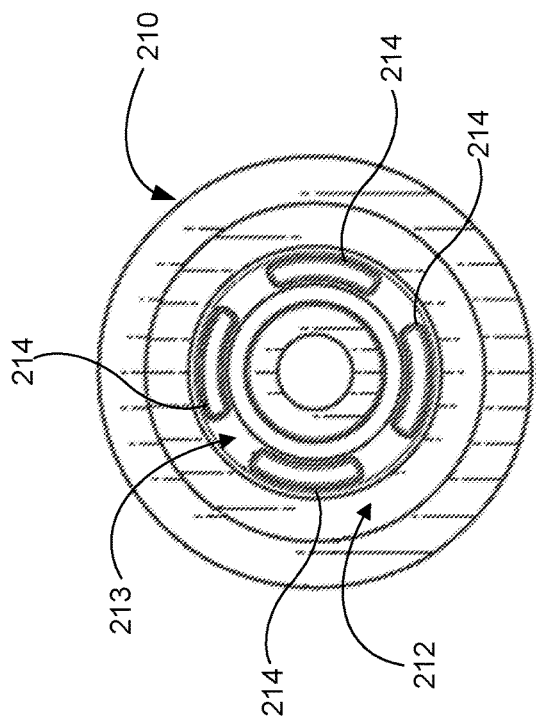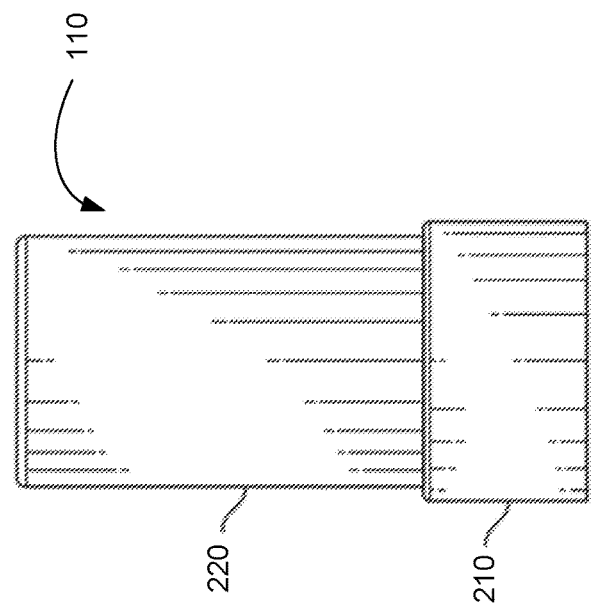

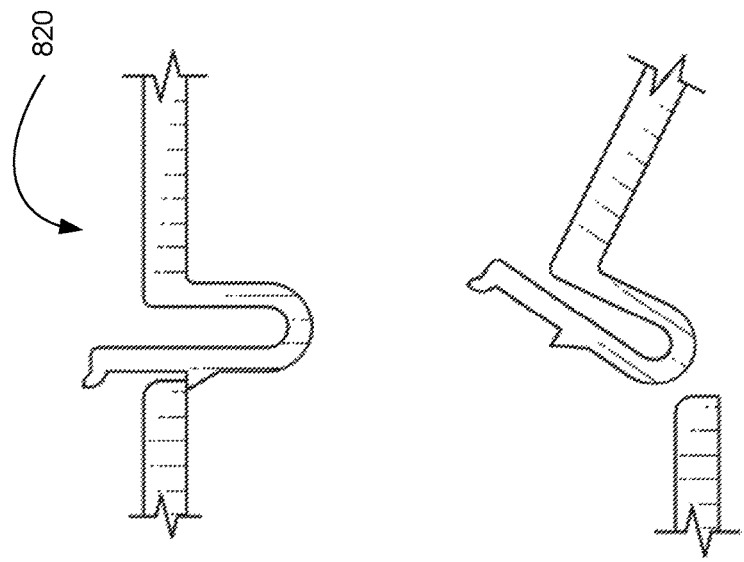
FIG. 8B
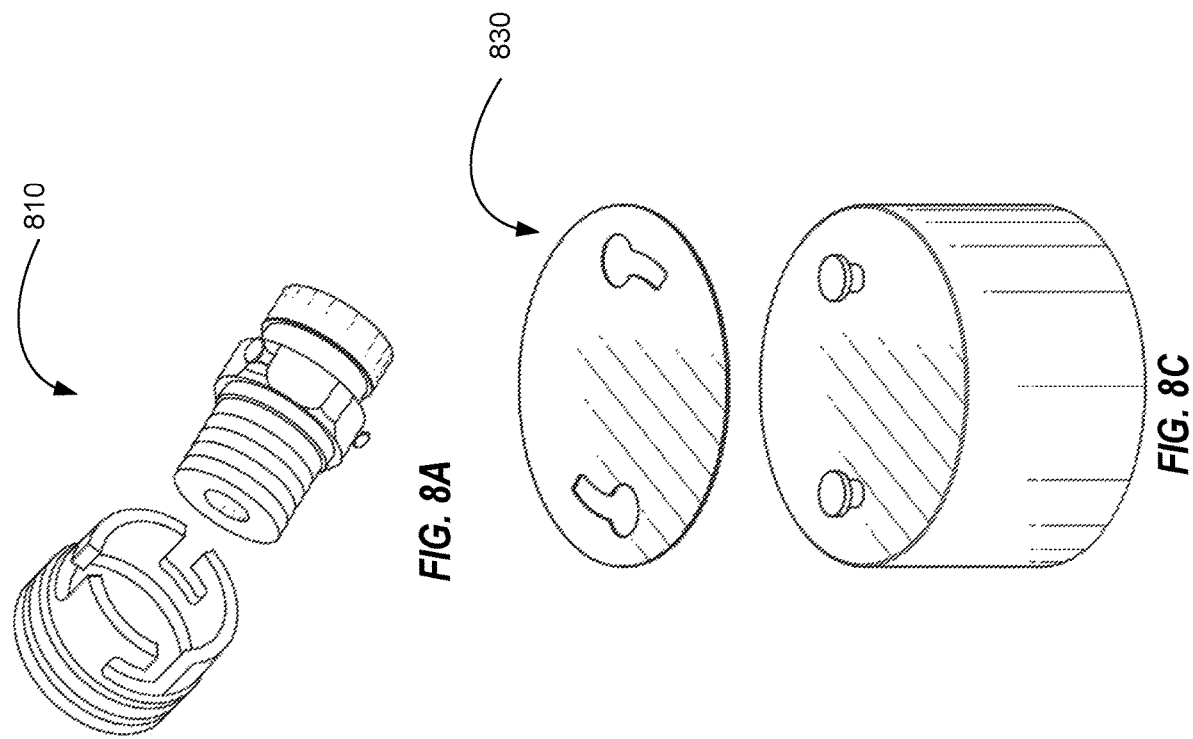
FIG. 8A
FIG. 8C

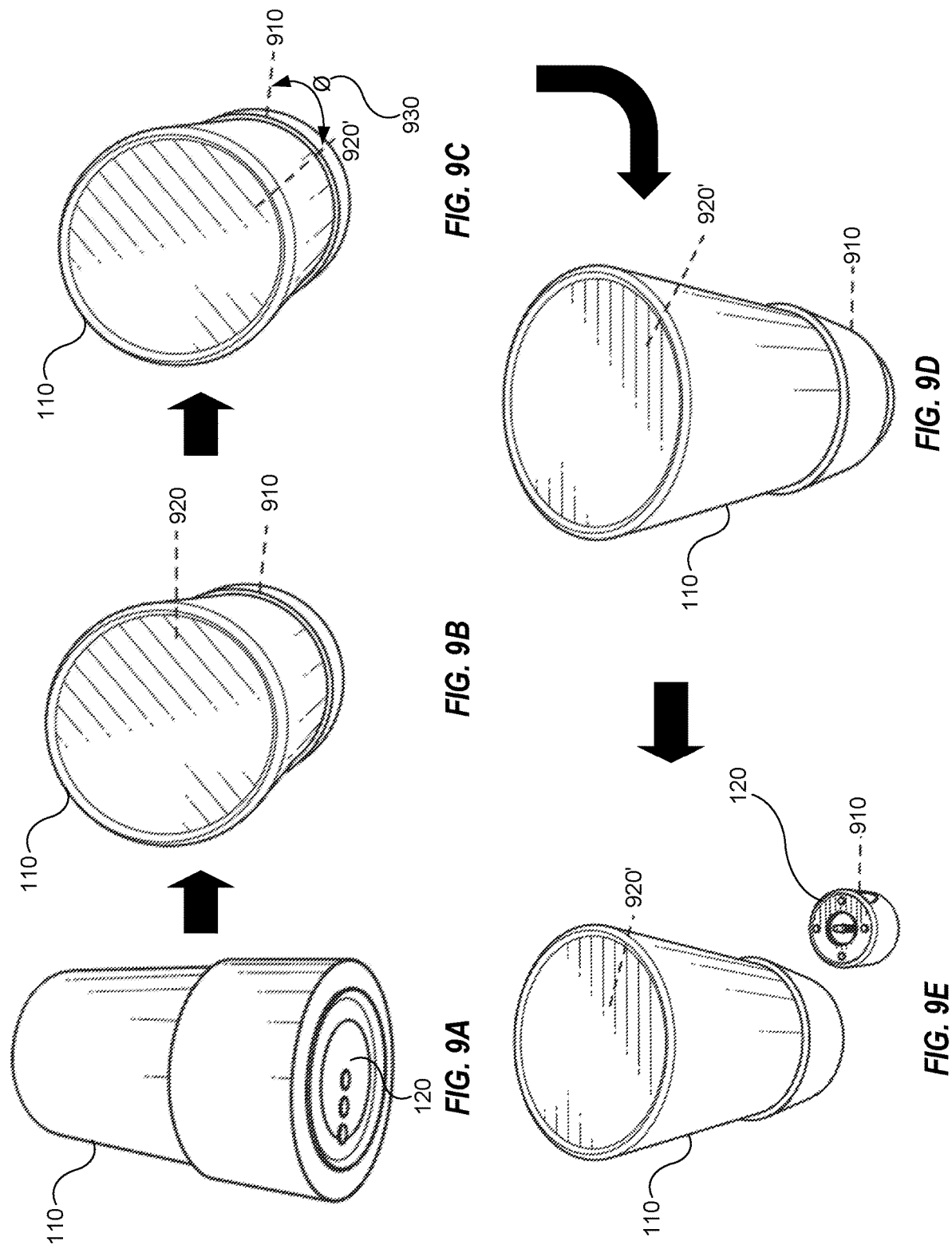

ELECTRIC LIGHTING SYSTEM AND COMPONENTS, AND CHARGING AND CONNECTION MECHANISMS THEREOF

CROSS-REFERENCE TO RELATED APPLICATIONS

This application is a national stage application, filed under 35 U.S.C. § 371, of International Patent Application No. PCT/US2019/019914, filed on 27 Feb. 2019, which claims priority and a benefit under 35 U.S.C. § 119(e) of U.S. Provisional Patent Application 62/635,606, filed 27 Feb. 2018. The disclosures of all of these prior applications are hereby incorporated by reference as if fully set forth below.

TECHNICAL FIELD

Aspects of the present disclosure relate to lighting instrumentality and, more particularly, to electric lighting systems and charging and connection mechanisms thereof.

BACKGROUND

A candle or other flame-based light source may create a fire risk and otherwise cause harm or annoyance through the creation of smoke, heat, and residue. An electric lighting system may provide light without these detrimental effects. Portable and rechargeable electric lighting systems may provide additional benefits to a user by, for example, mimicking the portability of a candle light source. But effectuating recharging in such systems may be cumbersome and time consuming, thus limiting the ability to enjoy the electric lighting system. In addition, assembling and disassembling the various components of such systems may be difficult, or non-intuitive, and the connection mechanisms may be unsightly.

SUMMARY

Example embodiments of the disclosed technology include an electric lighting system having a light source holder, one or more electric lights (also referred to herein as an electric light sources), and a charger (also referred to herein as a charging platform or platform charger). In any of the embodiments disclosed herein, the electric light source may be insertable into a bottom cavity of the light source holder, and the position of the electric light source within the light source holder may be maintained with one or more magnets disposed in the electric light source and the light source holder. In any of the embodiments disclosed herein, twisting the electric light source relative to the light source holder within the bottom cavity may separate the one or more magnets, releasing the electric light source from within the light source holder.

In any of the embodiments disclosed herein, the charger may be a platform charger. The electric light source may be charged by placing the electric light source on the platform charger. One or more magnets in either or both of the electric light source and the charger may draw a charging pin from within the platform charger to a charging contact of the electric light source.

In any of the embodiments disclosed herein, an electric lighting system may have a plurality of electric light sources. The electric light sources, which are compatible with the light source holder, may be swappable. For example, a first electric light source may be charging, for example in a utility room, while a second electric light source is assembled with the light source holder and placed, for example, on a table in a dining room. Later, the first and second electric light sources may be swapped so that the first electric light source is paired with the light source holder and the second electric light source is connected to the charger and charging. In any of the embodiments disclosed herein, the various electric light sources may have different visual features, such as color or lighting mode (e.g., candle mimicry, flashing, etc.), and a particular electric light source may be selected to be connected with the light source holder based on a desired visual feature.

In any of the embodiments disclosed herein, an electric lighting system may have a plurality of light source holders. The light source holders may be swappable with the electric light source. For example, the electric light source may be inserted within a cavity of any one of the plurality of light source holders at a time. The light source holders may vary based on some visual feature, for example, having various geometry, opaqueness, colors, or light-hole patterns, and may be selected to be connected with the electric light source based on a desired visual effect.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE FIGURES

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings:

FIGS. 2A-2C illustrate various perspective views of a light source holder according to an example embodiment;

FIGS. 8A-8C illustrates connection mechanisms for connecting an electric light source with a light source holder according to one or more example embodiments;

FIGS. 9A-9E illustrates disconnection of an electric light source from a light source holder according to an example embodiment;

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Example embodiments of the disclosed technology include an electric lighting system having a light source holder, one or more electric lights (also referred to herein as an electric light sources), and a charger (also referred to herein as a charging platform or platform charger). In any of the embodiments disclosed herein, the electric light source may be insertable into a bottom cavity of the light source holder, and the position of the electric light source within the light source holder may be maintained with one or more magnets disposed in the electric light source and the light source holder. In any of the embodiments disclosed herein, twisting the electric light source relative to the light source holder within the bottom cavity may separate the one or more magnets, releasing the electric light source from within the light source holder.

Some example embodiments of the disclosed technology will be described more fully hereinafter with reference to the accompanying drawings. One of ordinary skill will understand that the disclosed technology might be embodied in many different forms and should not be construed as limited to the example embodiments set forth herein.

Figure 1:
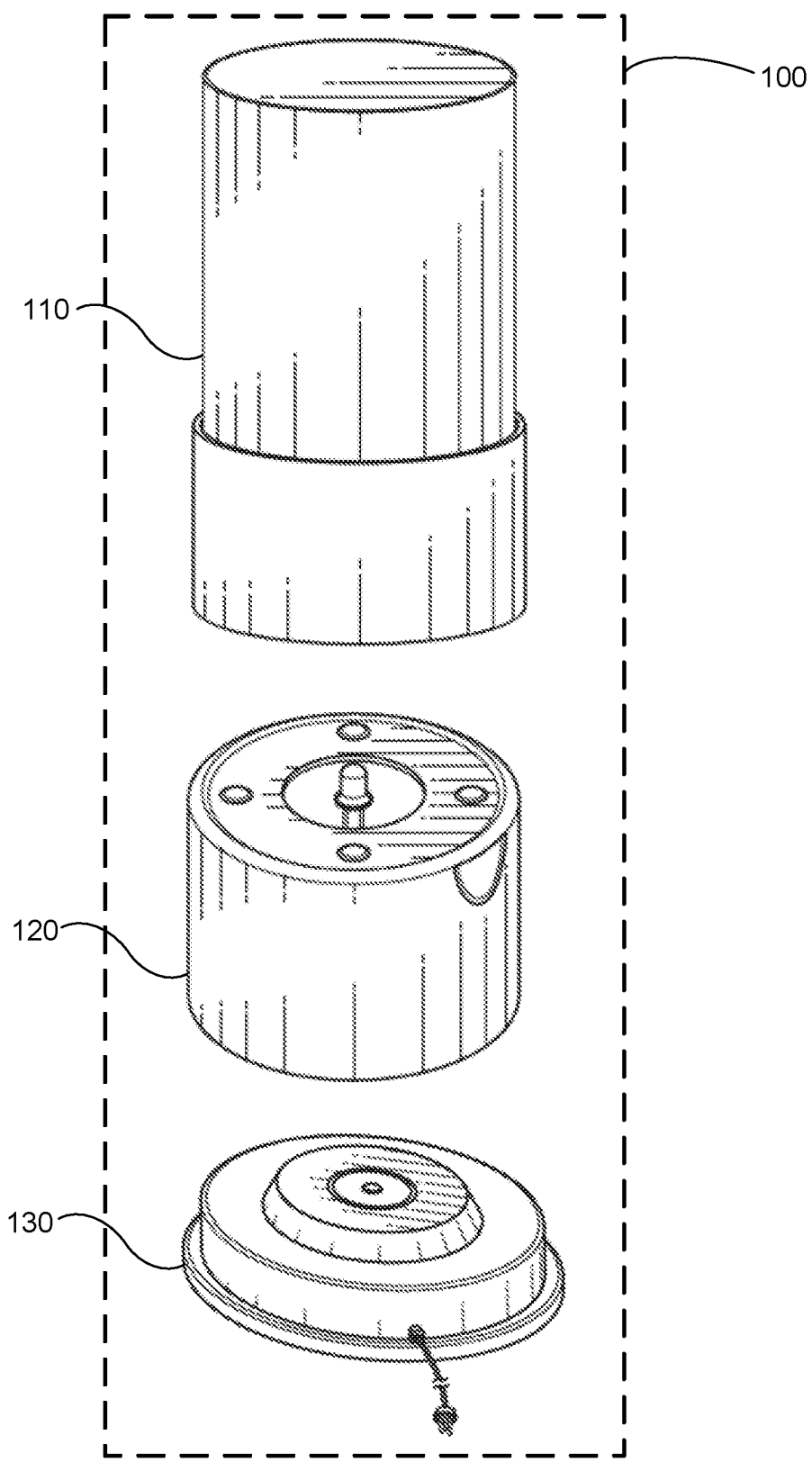
FIG. 1 is a perspective view of a disassembled electric lighting system according to an example embodiment.

Referring now to the drawings, FIG. 1 illustrates a disassembled electric lighting system according to an example embodiment. In any of the embodiments disclosed herein, the electric lighting system 100 includes a light source holder 110, one or more electric light sources 120, and a charger 130. The light source holder 110 may be combinable, or removably coupleable, with the one or more electric light sources 120. In any of the embodiments disclosed herein, when the electric light source 120 is removably coupled to the light source holder 110, the electric light source 120 and the light source holder 110 share a central axis. The electric light sources 120 may emit light, and the emitted light may be disbursed by the light source holder 110 when the electric light source 120 is connected to the light source holder 110 (as described below with reference to FIG. 5 in more detail). The charger 130 may charge batteries (not shown) disposed in the respective electric light sources 120 and may be configured for electrical communication with a power source. In any of the embodiments disclosed herein, the charger 130 may include a power cord connectable to a power source. In any of the embodiments disclosed herein, the charger 130 may be a platform charger (as depicted herein), a traditional plugin type charge, or any other charging system that can transmit electrical power from a source to an electric light source 120.

The electric lighting system 100 may include a plurality of electric light sources 120. The electric light sources 120 may be swappable within the light source holder 110 (e.g., each of the electric light sources 120 may be assembled with the light source holder 110, or disassembled with the light source holder 110 and replaced by another electric light source 120). Batteries within the electric light sources 120 may be individually charged by the charger 130. In any of the embodiments disclosed herein, one electric light source 120 may be charged by the charger 130, while another electric light source 120 is assembled with the light source holder 110 and disposed remote from the charger 130. Though not shown, it is contemplated that in any of the embodiments disclosed herein, the light source holder 110 and the electric light source 120 may be integrated, such that they are not readily detachable.

Various features of the electric lighting system 100 and its components will be discussed in greater detail below with reference to FIGS. 2A-12.

FIGS. 2A-2C illustrate a light source holder according to an example embodiment. The light source holder 110 includes a base 210 and a chimney 220. The base may be substantially hollow and may be configured to receive an electric light source 120. The chimney 220 may be configured to disperse light emitted from a connected electric light source 120.

The base 210 may include a cavity 212 configured and sized to receive an electric light source 120. The cavity 212 may have similar geometry (e.g., size and shape) to the electric light source 120. In any of the embodiments disclosed herein, the cavity 212 may have a greater size than the electric light source 120 to enable a clearance fit between the two. In any of the embodiments disclosed herein, the cavity 212 may be substantially cylindrical, and the electric light source 120 may be able to rotate therein. In any of the embodiments disclosed herein, when the electric light source 120 is removably coupled to the light source holder 110 inside the cavity 212, the electric light source and the light source holder share a central axis.

The cavity 212 may include an attachment surface 213 for making maintaining a mechanical connection with an electric light source 120. The attachment surface 213 that contacts the electric light source 120 may include one or more grooves 214. The grooves 214 may be disposed thereon the attachment surface 213 and may serve to guide movement of the electric light source 120 (as will be discussed below in greater detail with reference to FIGS. 3 and 5). In any of the embodiments disclosed herein, the grooves 214 may be configured along a substantially circular path. For example, in any of the embodiments disclosed herein, the one or more grooves 214 may be positioned between inner and outer perimeters of the attachment surface 213 and/or any other position relative to positioning members of the electric light source 120.

In any of the embodiments disclosed herein, one or more magnets 215 may be used as an attachment mechanism for maintaining a connection with the electric light source 120. The base 210 may further comprise a light source surface 216. For example, in any of the embodiments disclosed herein, the light source surface 216 may be opposite the attachment surface 213. In any of the embodiments disclosed herein, the one or more magnets 215 may be disposed on the light source surface 216. The one or more magnets 215 may be positioned between inner and outer perimeters of the light source surface 216. Further, the one or more magnets 215 may be positioned relative the one or more grooves 214. For example, in any of the embodiments disclosed herein, the one or more magnets 215 may be positioned relative an end of one or more grooves 214, in the middle of the one or more grooves 214 such that a portion of a groove 214 is magnetized and a portion is non-magnetized, or any other suitable position on the light source surface 216 of the base 210.

The attachment surface 213 may include a hole configured to allow light emitted from the electric light source 120 to pass there through. In any of the embodiments disclosed herein, the hole may be covered with a cover (e.g., cover 610 discussed further herein). In any of the embodiments disclosed herein, the cover 610 may comprise a transparent or translucent material. In any of the embodiments disclosed herein, the chimney 220 can be made of a transparent material, such as, as non-limiting examples, clear glass or plastic. In any of the embodiments disclosed herein, the chimney 220 may be made of a translucent material, such as frosted glass or translucent plastic. In any of the embodiments disclosed herein, the chimney 220 may be made of an opaque material, such as metal or silvered glass. In any of the embodiments disclosed herein, the chimney 220 may be colored and translucent.

In any of the embodiments disclosed herein, the chimney 220 may be incorporated into the base 210. For example, in any of the embodiments disclosed herein, the chimney 220 may be detachably connected to the base 210. In any of the embodiments disclosed herein, light source holder 110 may not include a chimney 220. Further, in any of the embodiments disclosed herein, the chimney 220 can be cylindrical, though in some embodiments, the chimney 105 may take on other three-dimensional shapes such as a sphere, cuboid, triangular prism, or other shape as desired.

Figure 3B:
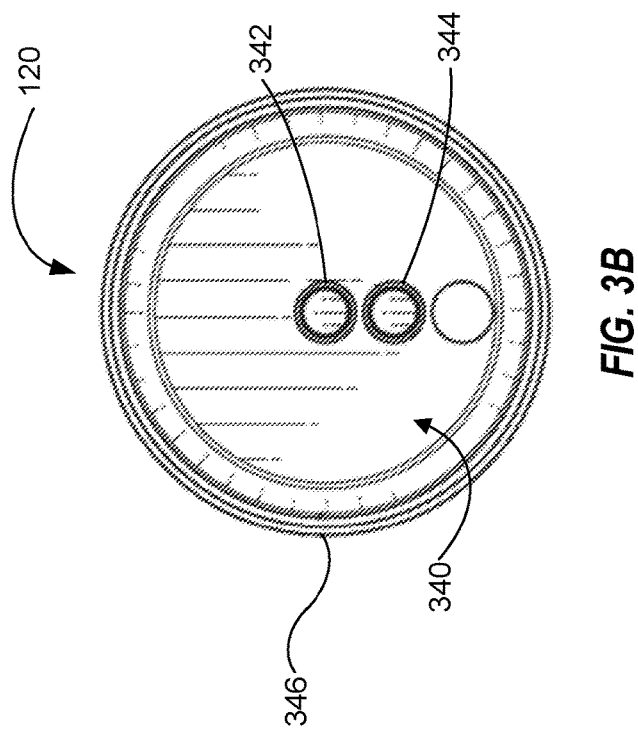
FIGS. 3A and 3B illustrate various perspective views of an electric light source according to an example embodiment.
Figure 3A:
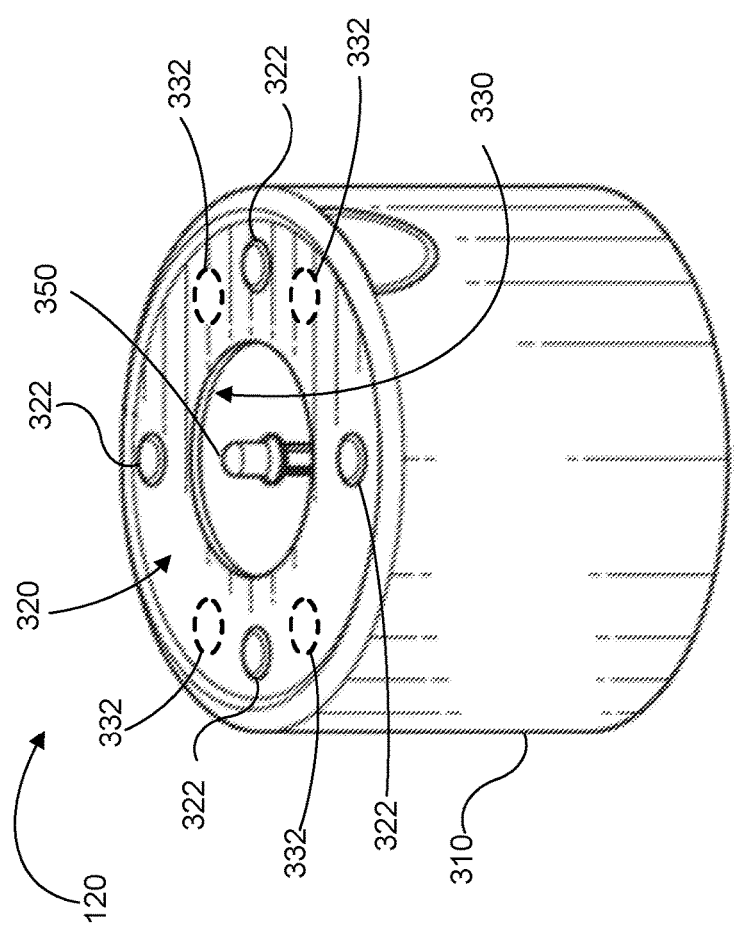

FIGS. 3A and 3B illustrate an electric light source according to an example embodiment. The electric light source 120 may include a body 310 housing a battery (not pictured) and a lighting element 350. In any of the embodiments disclosed herein, the electric light source 120 may be substantially cylindrical. A top surface 320 of the electric light source 120 may be sized to be received by the cavity 212 and configured to attach to the attachment surface 213 of the light source holder 110. The top surface 320 may include one or more guides 322 disposed thereon. The one or more guides 322 may be positioned between inner and outer perimeters of the top surface 320. The guides 322 may be configured to interact with the grooves 214 disposed on the attachment surface 213 of the light source holder 110. Further, the one or more guides 320 may be positioned relative the one or more grooves 214. The guides 322 may be made of a material to enable smooth gliding between attachment surface 213 of the light source holder 110 and the top surface 320.

One or more magnets 332 may be disposed proximate to (e.g., disposed on, or integrated with) the top surface 320. Further, one or more magnets 332 may be disposed proximate to (e.g., disposed on, or integrated with) an underside 330 of the top surface 320. In any of the embodiments disclosed herein, the magnets 332 may be disposed proximate to the guides 322. The one or more magnets 332 may be arranged to match with the one or more respective magnets 215 of the light source holder 110 in order to maintain a connection between the light source holder 110 and the electric light source 120. For example, in any of the disclosed embodiments, the at least one magnet 332 of the electric light source 120 and the at least one magnet 215 of the base 210 may have opposite magnetic polarities. Further, for example, when the top surface 320 of the electric light source 120 is brought proximate the attachment surface 213 of the cavity 212, a magnetic attraction force between the at least one magnet 332 of the electric light source 120 and the at least one magnet 215 of the base 210 may cause the base 210 to rotate relative to the electric light source 120 and/or may cause the electric light source 120 to rotate relative to the base 210.

A bottom surface 340 of the electric light source 120 may be configured to connect with the charger 130. A first and second electric contact 342 and 344 may be disposed on the bottom surface 340. At least one of the first or second electric contacts 342 and 344 may be magnetized. Accordingly, when the electric light source 120 is disposed on the charger 130, the magnetized electric contact 342 or 344 may draw a charging pin of the charger 130 to make electrical contact with the charging pin. The bottom surface 340 may further include a static friction element 346. The static friction element 346 may be configured to resist movement of the bottom surface 340 when contacting another surface (e.g., a table top). For example, in any of the embodiments of the embodiments disclosed herein, when a rotational force sufficient to overcome the magnetic attraction force between the at least one magnet 332 of the electric light source 120 and the at least one magnet 215 of the base 210 is applied to the light source holder 110, static friction between the static friction element 346 and a supporting surface impedes rotation of the electric light source 120 relative to the supporting surface such that the light source holder 110 can (i) rotate relative to the electric light source 120 and (ii) be uncoupled from the electric light source 120. In any of the embodiments disclosed herein, the static friction element 346 may include rubber, a rubberized component, or any other suitable material.

The electric light source 120 includes a lighting element 305. The lighting element 305 may include one or more lighting elements 305 (e.g., light-emitting diodes (LEDs)). In any of the embodiments disclosed herein, the lighting element 305 may include a single LED board with an array of LEDs. The LEDs may be organized in different configurations or grouped into channels. In any of the embodiments disclosed herein, the lighting element 305 may be configured to generate a flickering light effect, for example, to mimic a flame, for example, as described in U.S. patent application Ser. No. 15/825,450, the entire disclosure of which is incorporated herein by reference as if set forth in full. The lighting element 305 may be similar to that described in U.S. patent application Ser. No. 15/825,450.

Figure 5B:
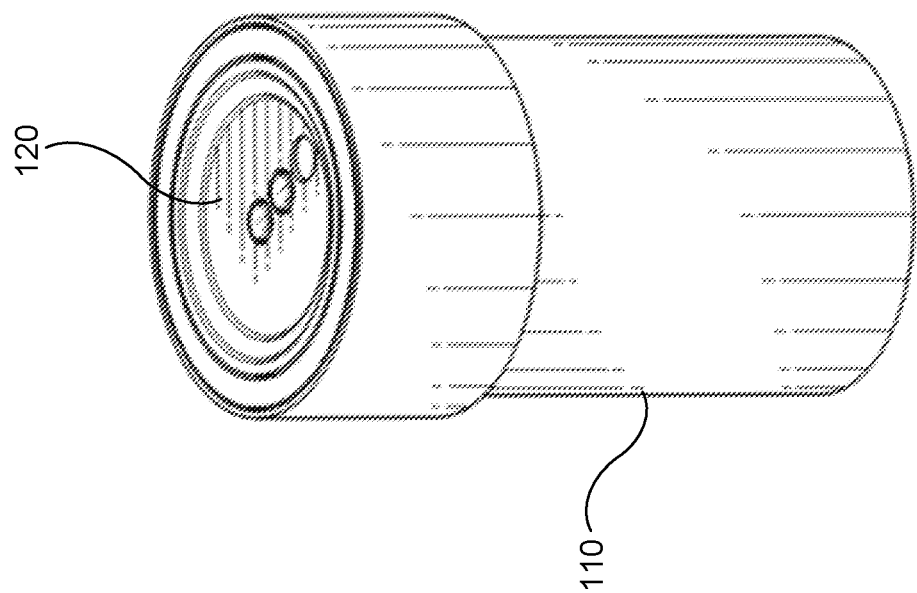
FIGS. 5A and 5B illustrate various perspective views of an electric light source assembled with a light source holder according to an example embodiment.
Figure 5A:
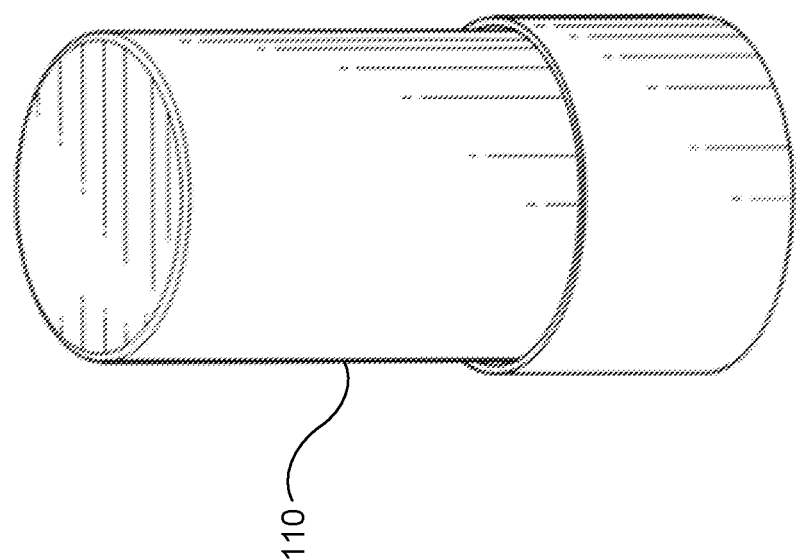

FIGS. 5A and 5B illustrate the electric light source 120 disposed within the light source holder 110. The electric light source 120 has substantially similar geometry as the cavity 212 of the light source holder 110. The bottom surface 340 of the electric light source 120 is substantially flush with a bottom of the light source holder 110. Light from the electric light of the electric light source 120 may be emitted through the hole formed in the attachment surface 213 of the light source holder 110.

To connect the light source 120 to the light source holder 110, the light source 120 may be inserted into the cavity 212, or the cavity 212 of the light source holder 110 may be placed around the electric light source 120. The magnets 215 of the light source holder 110 and the magnets 332 disposed underside 330 of the top surface 320 may orient the electric light source 120 within the light source holder 110 (e.g., rotate the electric light source 120 and/or the light source holder 110 so that the magnets 254 and 332 are disposed relatively close to each other, or generate a force in the rotation direction). The magnetic force of the magnets 215 and 332 may maintain the light source 120 within the cavity 212 of the light source holder 110.

To disconnect the light source 120 from the light source holder, the magnets 215 and 332 must be separated. In any of the embodiments disclosed herein, the magnets 215 and 332 and guides 322 may be disposed such that the guides 322 are positioned at one end of a respective groove 214 when the magnets 215 and 332 are in maximal orientation (i.e., when the electric light source 120 is most secured within the light source holder 110). In any of the embodiments disclosed herein, the electric light source 120 may be rotated relative to the light source holder 110 to separate the magnets 215 and 321 (i.e., rotated such that the guides 322 move along the grooves 214). When the rotation moves the guides 322 to an opposite end of the grooves 214 from the maximal orientation, the guides 322 and grooves 214 may serve as a stopper to the rotation. At this point, the magnets 215 and 332 may be sufficiently separated such that the magnetic attraction does not impede removal of the electric light source 120 from the light source holder 110. For example, in any of the embodiments disclosed herein, the force of gravity may overcome the magnetic attraction at this position.

However, this is merely an example, and, in any of the embodiments disclosed herein, the magnets 215 and 332 and guides 322 may be disposed such that the guides 322 are positioned at a middle area of a respective groove 214 when the magnets 215 and 332 are in maximal orientation. In this case, the light source holder 110 and the electric light source 120 may be relatively rotated in either direction to separate magnets 215 and 332 such that the magnetic attraction does not impede removal of the electric light source 120 from the light source holder 110. When the rotation moves the guides 322 to either end of the grooves 214, the guides 322 and grooves 214 may serve as a stopper to the rotation, and the electric light source 120 may be released from the connection with the light source holder 110.

In any of the embodiments disclosed herein, the rotation may be achieved by a user applying downward pressure to the light source holder 110 and rotating the light source holder 110. The static friction element 346 disposed on the bottom surface 340 of the electric light source 120 may provide resistance to the rotation of the light source holder 110 via friction against a resting surface (e.g., a table, hand, or shelf) such that the light source holder 110 rotates while the electric light source 120 disposed within the cavity 212 is relatively static. For example, FIGS. 9A-9E illustrates disconnection of an electric light source 120 from a light source holder 110 according to an example embodiment. In FIG. 9A, the electric light source 120 is held securely within the cavity of a light source holder 110 by the magnets 215 and 332. In FIG. 9B, the light source holder 110 is placed on a surface such that the light source holder 110 is oriented along axis 920 and the electric light source 120, located inside the light source holder 110, is oriented along axis 920. In FIG. 9C, a downward and clockwise force is applied to the light source holder 110 causing the light source holder 110 to be rotated clockwise by some degree 930 from axis 920 to axis 920', thus reducing the attractive force applied by magnets 215 and 332. Due to the static friction element 346, the electric light source 120 does not move with the light source holder 110. In FIG. 9D, the light source holder 110 may then be lifted up causing the light source holder 110 to separate from the electric light source, as depicted in FIG. 9E.

Figure 4:
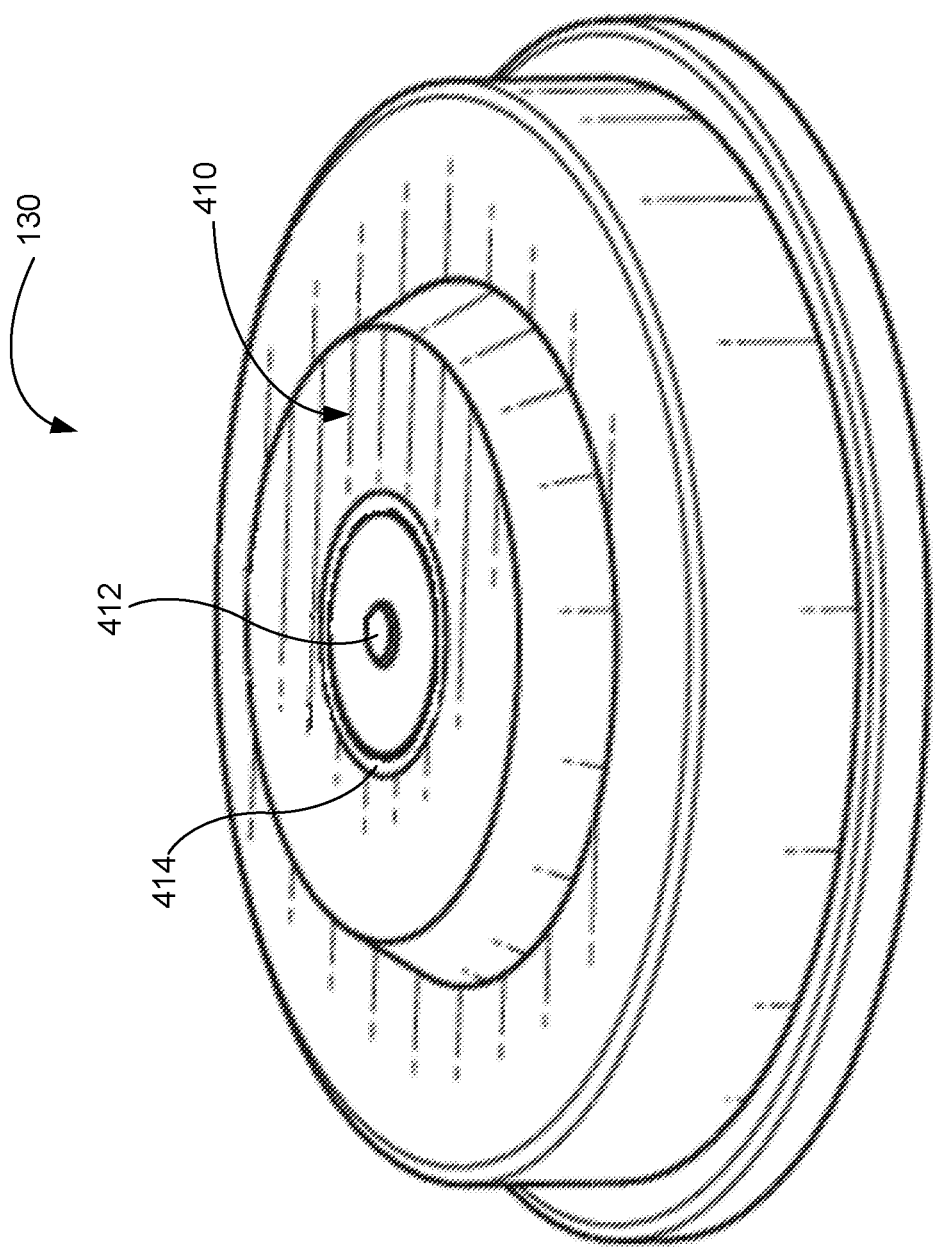
FIG. 4 illustrates a charging platform according to an example embodiment.
Figure 6:
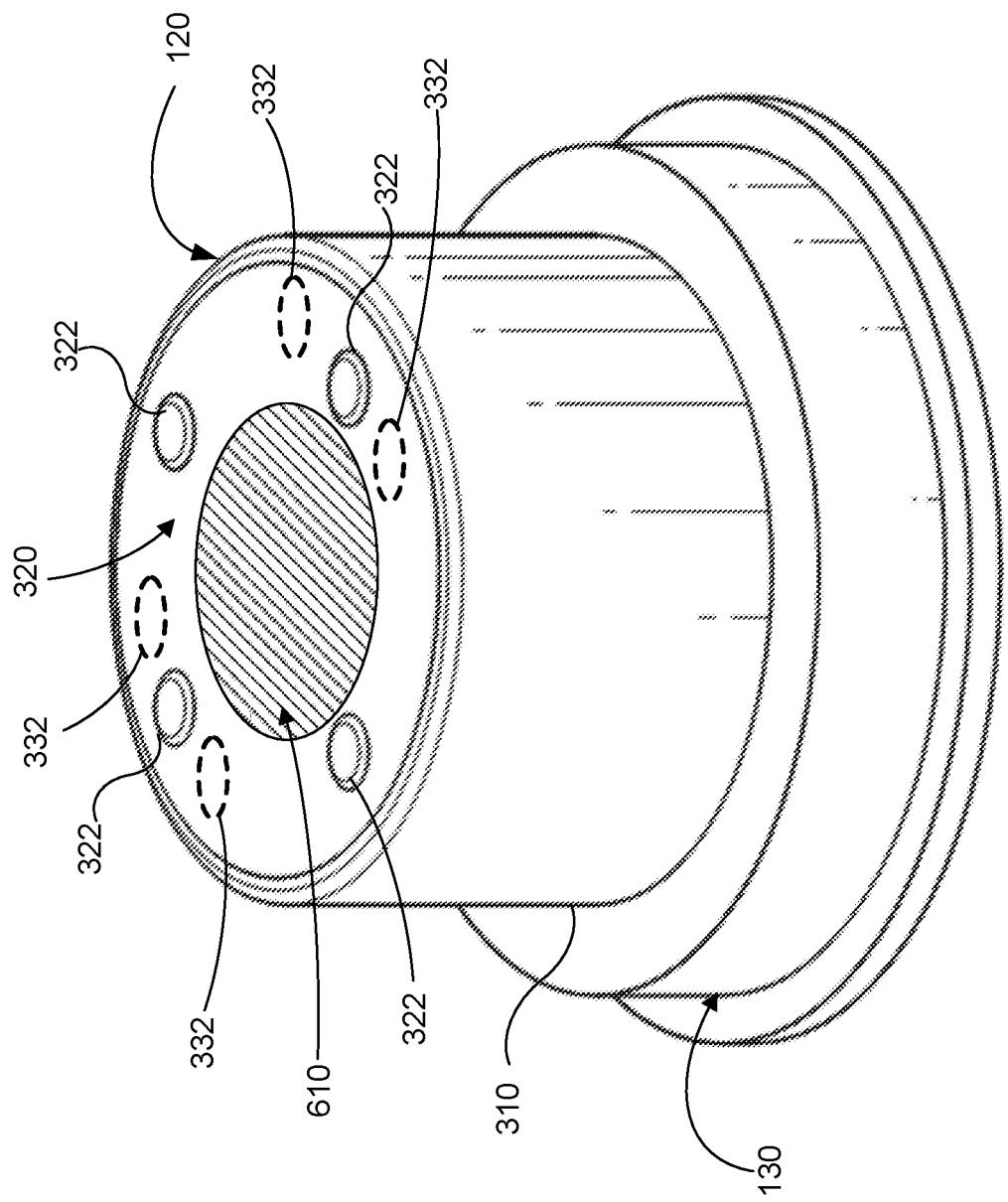
FIG. 6 illustrates an electric light source charging on a charging platform according to an example embodiment.

Referring now to FIG. 4, a charger is shown according to an example embodiment. The illustrated charger 130 is a platform charger 130. One of ordinary skill will understand that the platform charger 130 illustrated in FIG. 4 is merely a non-limiting example, and the charger 130 may be of various types and configurations. The platform charger 130 may be configured to charge the electric light source 120 when supporting the bottom surface 340 of the electric light source 120 with its upper surface 410, for example, as illustrated in FIG. 6. A first and second charging contact 412 and 414 may be disposed on the upper surface 410, and configured to match with the first and second electric contacts 342 and 344 of the electric light source 120. The first charging contact 412 may be a charging pin 412. The charging pin 412 may be positioned within the platform charger 130. The second charging contact 414 may be a charging ring 414. The charging ring 414 may be positioned within the platform charger 130. For example, in any of the embodiments disclosed herein, the charging pin 412 may be disposed proximate the center of the charging ring 414. In a case where the first electric contact 342 is magnetized, when the electric light source 120 is positioned on the platform charger 130, the magnetized first electric contact 342 may draw the charging pin 412 out of the platform charger 130 to contact the first electric contact 342, thereby completing an electric circuit.

Figure 7:
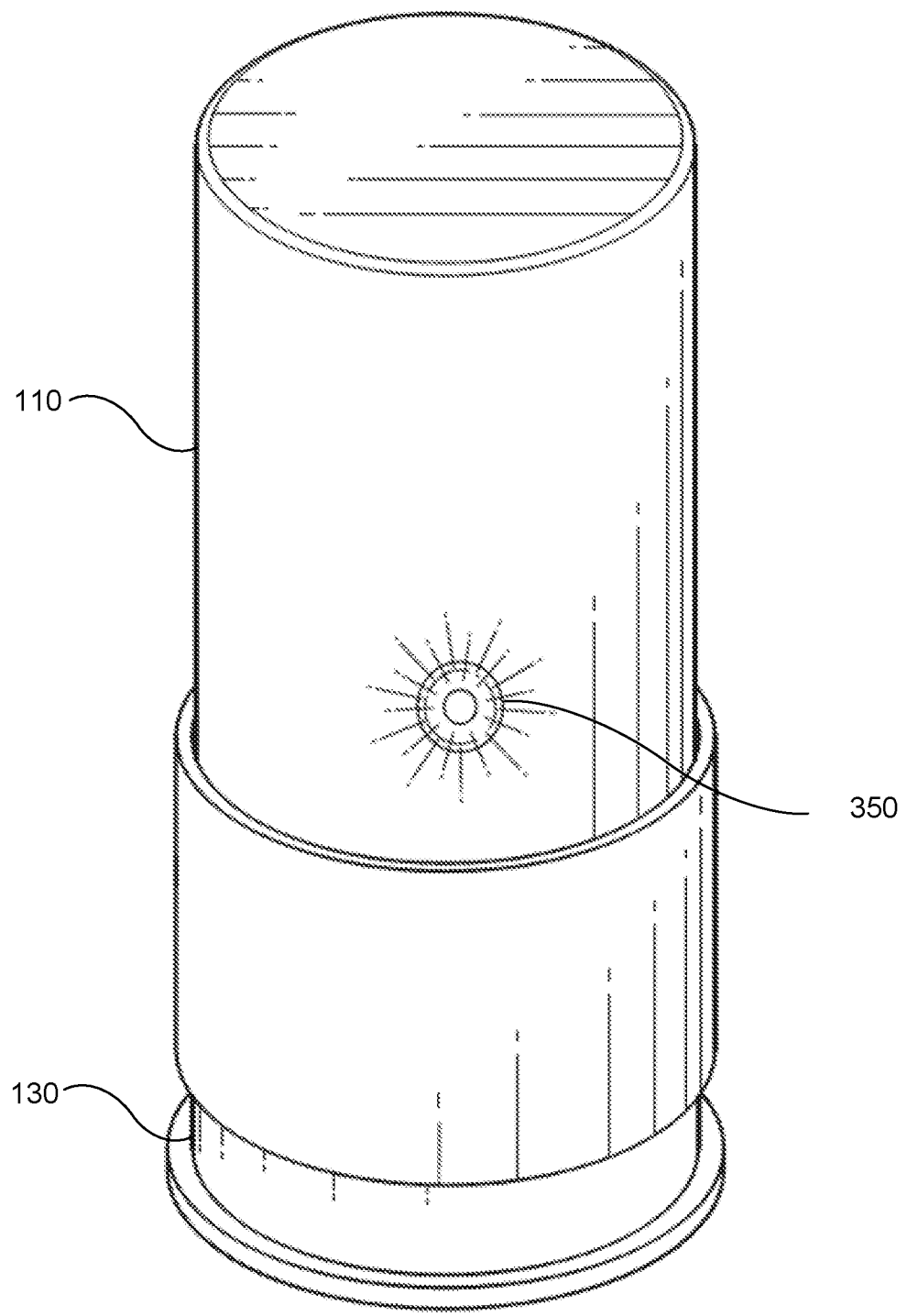
FIG. 7 illustrates an electric light source assembled with a light source holder charging on a charging platform according to an example embodiment.

The second charging contact 414 may be a coaxial contact 414 surrounding the charging pin 412. In this case, the platform charger 130 may charge the battery of the electric light source 120 in any rotational orientation. But this is merely an example and, in any of the embodiments disclosed herein, a particular orientation may be needed to effectuate charging. For example, in any of the embodiments disclosed herein, the charging pin 412 may configured to transition from a retracted position to an extended position and the charging ring 414 may be in a fixed position. In any of the embodiments disclosed herein, the platform charger 130 may be configured to charge the electric light source 120 even while the electric light source 120 is assembled with an electric light holder 110, for example, as illustrated in FIG. 7. But this is merely an example and, in any of the embodiments disclosed herein, the platform charger 130 may not accommodate the electric light source 120 when it is disposed within the cavity 212 of the electric light holder 110.

FIGS. 8A-8C illustrate various connection mechanisms for connecting an electric light source 120 with a light source holder 110 according to any of the embodiments disclosed herein. In any of the embodiments disclosed herein, the illustrated connection mechanisms may be used instead of magnets 214 and 324. For example, in any of the embodiments disclosed herein, a turn and lock mechanism 810, snap and lock mechanism 820, and a slide and lock mechanism 830 may be incorporated into an electric light source 120 and a light source holder 110. But one of ordinary skill will understand that these are merely examples and, in any of the embodiments disclosed herein, alternative connection mechanisms (e.g., simple screw, etc.) may be used to connect an electric light source 120 and a light source holder 110.

Figure 10:
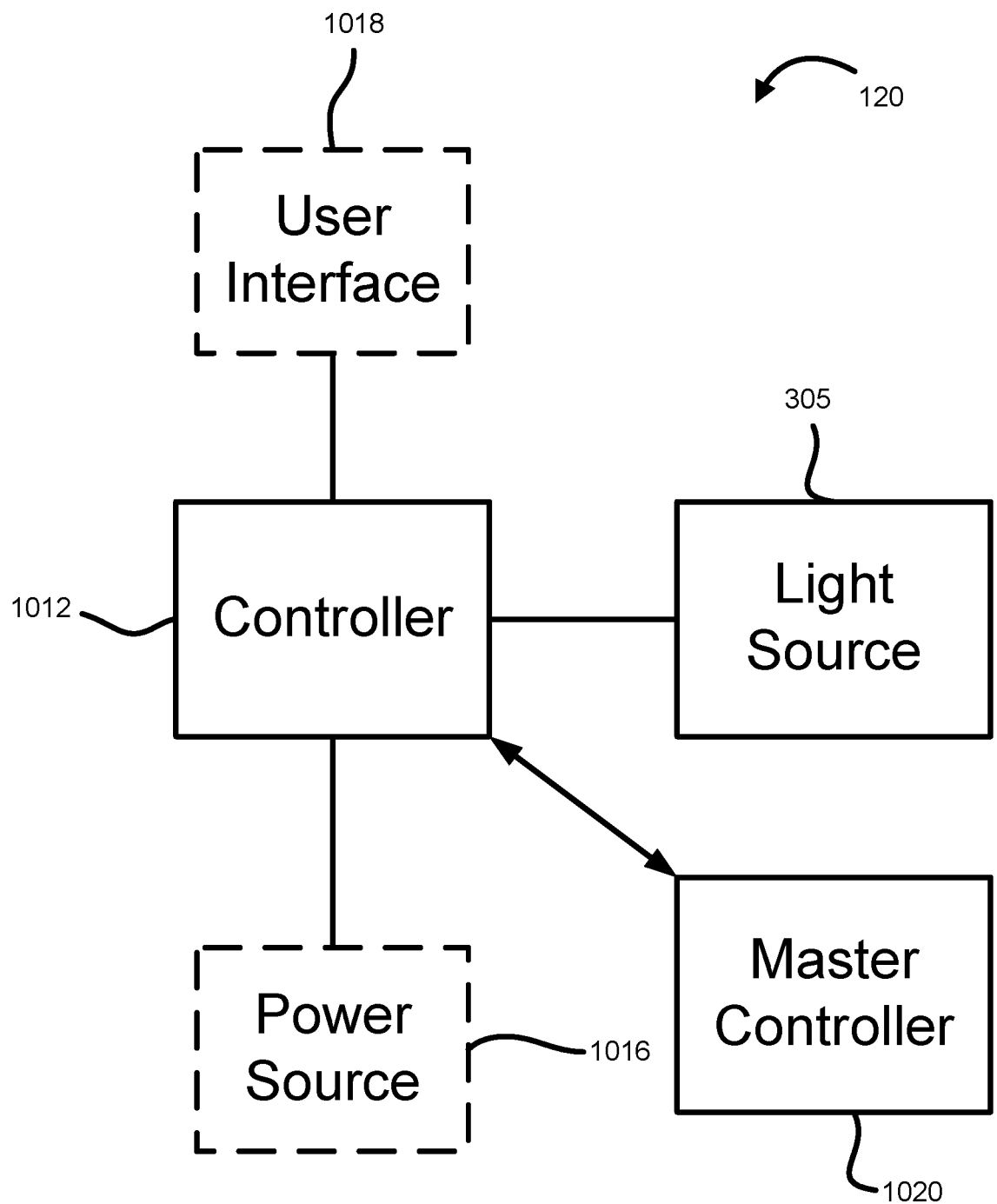
FIG. 10 is a block diagram of a base of a flameless candle according to an example embodiment.

FIG. 10 is a block diagram of an electric light source, or module, 120 according to an example embodiment. In any of the embodiments disclosed herein, the electric light source 120 includes a controller 1012, light source 305, a power source 1016 (e.g., a battery), a user interface 1018, and a master controller 1020.

In any of the embodiments disclosed herein, the controller 1012 may include a storage and a processor. In any of the embodiments disclosed herein, the controller 1012 may be a microcontroller or a microprocessor. The controller 1012 may be configured to control the light source 305. For example, the controller 1012 may be configured to control the light source 305 to produce a flickering light effect using a flickering method, for example, as discussed in U.S. application Ser. No. 15/825,450.

In any of the embodiments disclosed herein, the power source 1016 may be included within the electric light source 1020. For example, the power source 1016 may include one or more batteries disposed within the electric light source 1020. In any of the embodiments disclosed herein, the power source 1016 may be disposed separate from the electric light source 1020. In any of the embodiments disclosed herein, power may be supplied from an external power source 1016, such as a wall outlet. In further embodiments, power may be supplied through a hardwire connection to a power grid. The controller 1012 may control the light source 305 to produce a flickering light effect by controlling an amount of power provided to the light source 305, such power being received from the power source 1016.

As illustrated by FIG. 10, in any of the embodiments disclosed herein, the electric light source 120 may include a user interface 1018. The user interface 1018 can provide for user control of the electric light source 120. In any of the embodiments disclosed herein, the user interface 1018 may be used to select an on/off state of the electric light source 120. Further, the user interface 1018 may be used to select an on/off state of a flickering effect of the electric light source 120. Additionally, the user interface 1018 may be used to adjust and/or modify the flickering effect of the electric light source 120. The controller 1012 may control the light source 305 in accordance with a user interaction with the user interface 1018.

The master controller 1020 may command a specific setup of the electric light source 120. For example, the master controller 1020 may command a specific illumination level or flickering mode of the electric light source 120. In any of the embodiments disclosed herein, the master controller 1020 may be in communication with one or more controllers 1012 of the electric light source 120. In any of the embodiments disclosed herein, the master controller 1020 may send instructions to the controller 1012 to implement specific setups. Alternatively, in any of the embodiments disclosed herein, the master controller 1020 may be implemented within the controller 1012 (e.g., as software, hardware, or a combination of software and hardware).

In any of the embodiments disclosed herein, the master controller 1020 may be external to the electric light source 120. In any of the embodiments disclosed herein, the controller 1012 may be further configured to receive commands from an external master controller 1020. For example, the master controller 1020 may be implemented in a charging station (for example group charging station 1100 discussed below with reference to FIGS. 11A-11C), and may communicate with the controller 1012 while the electric light source 120 is connected to the charging station. In any of the embodiments disclosed herein, the master controller 1020 may be configured to communicate wirelessly with the controller 1012 to control the electric light source 120. In such cases, the master controller 1020 may communicate with the controller 1012 through the user interface 1018 or the controller 1012 may include a wireless receiver. In any of the embodiments disclosed herein, the master controller 1020 may communicate with a plurality of electric light source 120 (e.g., controllers 1012 of different electric light sources 120) simultaneously or substantially simultaneously. Accordingly, the plurality of electric light source 120 may be commanded to a particular setup simultaneously using the master controller 1020. In any of the embodiments disclosed herein, master controller 1020, may be embedded in an electric light source 120, such that the electric light source 120 may communicate commands to one or more other electric light sources 120. As will be appreciated, such distributed communication can improve the communication efficiency of an electric lighting system 100.

Figure 11A:
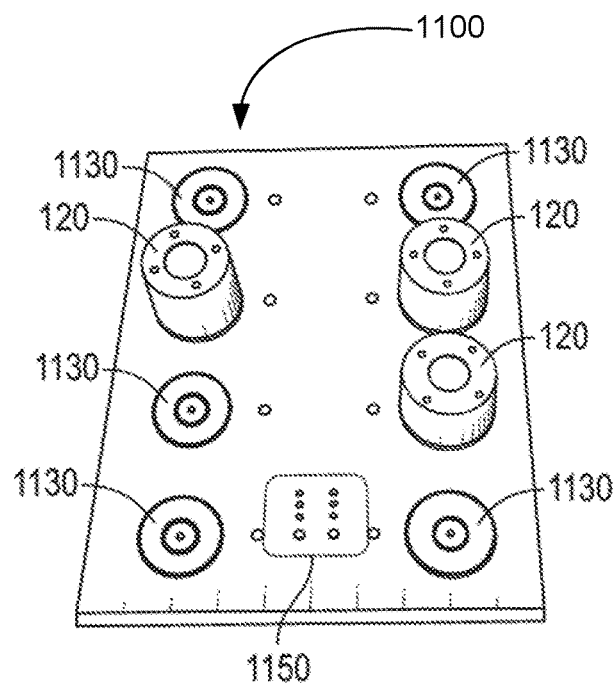
FIGS. 11A-11C illustrate a group charging platform according to an example embodiment.
Figure 11B:
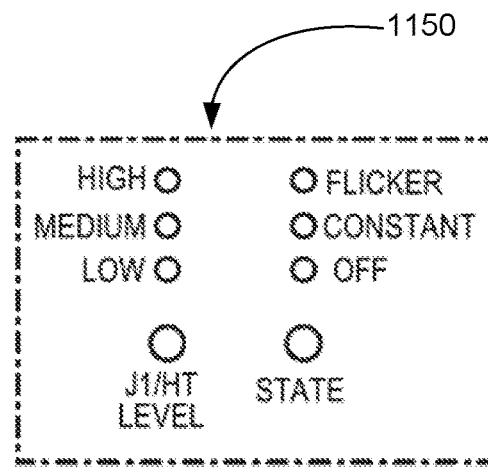
Figure 11C:
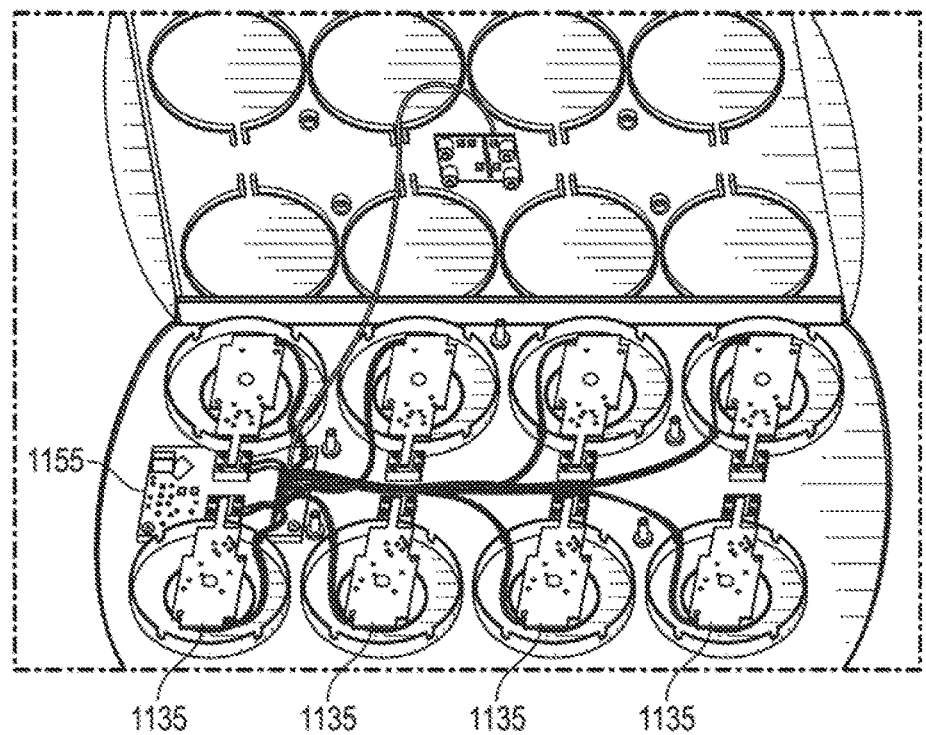

FIGS. 11A-11C illustrate a group charging station in accordance with an example embodiment. Group charging station 1100 may include a plurality of charging platforms 1130 and a control panel 1150. The control panel may be connected to a main charging board 1155, which may control a plurality of auxiliary charging boards 1135 connected to the charging platforms 1130. The charging platforms 1130 may be of various types and configurations. Each of the plurality of charging platforms 1130 may be configured to charge a respective electric light source 120 when supporting the bottom surface 330 of the electric light source 120. The charging platforms 1130 may be similar to the platform charger 130 described above with reference to FIG. 4.

The control panel 1150 may be configured to receive user input to adjust a state of one or more light sources 120 connected to the group charging station 1100. For example, the control panel may include inputs and indicators setting a brightness level of the light sources 120 low medium or high. In any of the embodiments disclosed herein, the control panel 1150 may also control a state of the one or more connected light sources 120, for example, between off, constant (e.g., steady light), and flicker (e.g., mimicking a flame). However, these are merely exemplary controls and one of ordinary skill will recognize that various additions or modifications may be made therein without departing from the present disclosure. The control panel interacts with the main control board 1155 may instruct the auxiliary charging boards 1135 based on instructions to the control panel 1150. Together, the main charging board 1155 and one or more auxiliary charging boards 1135 may make forma master controller 1020. In any of the embodiments disclosed herein, the main charging board 1155 and one or more auxiliary charging boards 1135 may control the electric light source 120 (e.g., control the controller 1012) through charging pins in the charging platforms 1130. One of ordinary skill will recognize that these are merely examples, and a group charging platform 1100 and master controller 1020 may take various forms as anticipated within the present disclosure.

Figure 12:
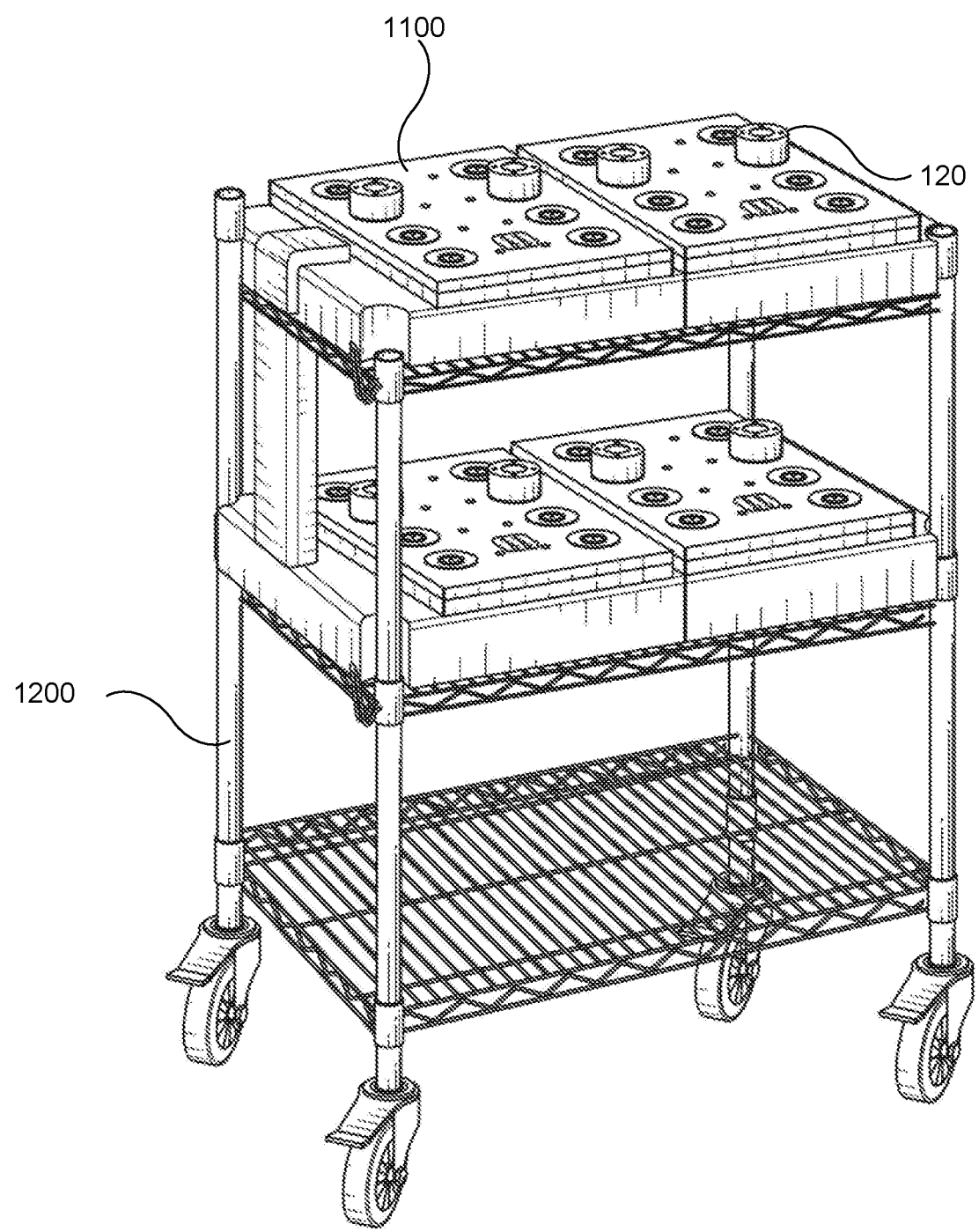
FIG. 12 illustrates a mobile transport according to an example embodiment.

FIG. 12 illustrates a mobile transport 1200 in accordance with an example embodiment. As shown, mobile transport 1200 has one or more shelves having incorporated thereon one or more group charging station 1100. In any of the embodiments disclosed herein, mobile transport 1200 may further include a mobile power unit, such as for example a mobile battery pack. As will be appreciated, mobile transport 1200 may allow for ease of communication between master controller 1020 and multiple light source controllers 1012.

The above description of one or more example embodiments and the examples included herein are provided to facilitate a greater understanding of the disclosure. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific example embodiments only and is not intended to be limiting.

In the above description, numerous specific details are set forth. However, it is to be understood that embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the example embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicates that different instances of like objects are being referred to, and are not intended to imply that the objects so described must be in a given sequence, either temporally, spatially, in ranking, or in any other manner.

Further, in describing one or more example embodiments, certain terminology is used to for the sake of clarity. It is intended that each term contemplates its broadest meaning as understood by those skilled in the art and includes all technical equivalents that operate in a similar manner to accomplish a similar purpose.

The materials described herein as making up the various elements of certain example embodiments are intended to be illustrative only and not restrictive. Many suitable materials that would perform a same or a similar function as the materials described herein are intended to be embraced within the scope of the example embodiments. Such other materials not described herein can include, but are not limited to, materials that are developed after the time of the development of the invention.

One of ordinary skill will understand that the forgoing descriptions are provided as non-limiting examples, and that various alternatives or modifications are considered within the scope of the present disclosure, and the patentable scope of what is claimed is defined by within the claims and their equivalents.

What is claimed is:

1. An electric lighting system comprising:
a charger configured for electrical communication with a power source, the charger comprising first and second charging contacts disposed on an upper surface, wherein the first charging contact is configured as a charging pin and the second charging contact is configured as a charging ring, the charging pin being disposed proximate the center of the charging ring;
an electric light source removably couplable to, and configured for electrical communication with, the charger, the electric light source comprising a lighting element, the electric light source comprising first and second electric contacts disposed on a bottom surface;
a light source holder removably couplable to the electric light source, wherein, when the electric light source is removably coupled to the light source holder, the electric light source and the light source holder share a central axis and the first charging contact contacts the first electric contact and the second charging contact contacts the second electric contact, and
wherein contact between the first charging contact and the first electric contact allows electrical communication between the first charging contact and the first electric contact, and wherein contact between the second charging contact and the second electric contact allows electrical communication between the second charging contact and the second electric contact,
wherein the charging pin and the first electric contact have opposing magnetic polarities,
wherein when the charging pin is brought proximate the first electric contact, a magnetic attraction force between the charging pin and the first electric contact causes the charging pin to transition from a retracted position to an extended position such that, when in the extended position, the charging pin is in electrical communication with the first electric contact; and
wherein the electric light source further comprises a top surface, at least one magnet disposed on an underside of the top surface, and at least one guide disposed thereon, the at least one guide positioned between (i) inner and outer perimeters of the top surface and (ii) first and second angular positions, the second angular position being a first clockwise distance from the first angular position, the at least one magnet positioned (a) between inner and outer perimeters of the underside of the top surface and (b) at a third angular position proximate to the first or second angular positions.

2. The electric lighting system of claim 1, wherein the charging pin is configured to transition from a retracted position to an extended position and the charging ring is in a fixed position.

3. The electric lighting system of claim 1, wherein the light source holder comprises a chimney and a base, the base having a cavity configured and sized to receive the electric light source, and the electric light source being sized to be received into the cavity.

4. The electric lighting system of claim 3, wherein:
the cavity comprises an attachment surface, the attachment surface having at least one groove disposed thereon, the at least one groove positioned between (i) inner and outer perimeters of the attachment surface and (ii) fourth and fifth angular positions, the fifth angular position being a second clockwise distance from the fourth angular position, the at least one groove configured to receive the at least one guide of the electric light source.

5. The electric lighting system of claim 4, wherein the base further comprises a light source surface, the light source surface being opposite the attachment surface, the light source surface having at least one magnet disposed thereon, the at least one magnet positioned (i) between inner and outer perimeters of the light source surface and (ii) at a sixth angular position proximate the fourth or fifth angular positions, but not between the fourth and fifth angular positions.

6. The electric lighting system of claim 5, wherein
when the third angular position is proximate the first angular position, the sixth angular position is proximate the fourth angular position, and wherein when the third angular position is proximate the second angular position, the sixth angular position is proximate the fifth angular position.

7. The electric lighting system of claim 6, wherein the at least one magnet of the electric light source and the at least one magnet of the base have opposite magnetic polarities, and wherein when the top surface of the electric light source is brought proximate the attachment surface of the cavity, a magnetic attraction force between the at least one magnet of the electric light source and the at least one magnet of the base causes the base to rotate relative to the electric light source such that: (i) when the third angular position is proximate the first angular position, the magnetic attraction force causes the base to rotate clockwise and (ii) when the third angular position is proximate the second angular position, the magnetic attraction force causes the base to rotate counterclockwise.

8. The electric lighting system of claim 7, wherein the bottom surface has a static friction element disposed thereon, and wherein, when a rotational force sufficient to overcome the magnetic attraction force is applied to the light source holder, static friction between the static friction element and a supporting surface impedes rotation of the electric light source relative to the supporting surface such that the light source holder can (i) rotate relative to the electric light source and (ii) be uncoupled from the electric light source.

9. The electric lighting system of claim 3, wherein the chimney comprises a translucent material.

10. The electric lighting system of claim 1, the electric light source further comprising a rechargeable battery, wherein the rechargeable battery is in a charging state when the charger is in electrical communication with a power source and the electric light source is removably coupled to and electrical communication with the charger.

11. The electric lighting system of claim 1, wherein the electric light source is a first electric light source, the electric lighting system further comprising a second electric light source, the second electric light source removably couplable to, and configured for electrical communication with, the charger, the second electric light source interchangeable with the first electric light source.

12. An electric lighting system comprising:
a plurality of lighting modules, the plurality lighting modules comprising a primary lighting module and at least one secondary lighting module, each lighting module of the plurality of lighting modules comprising:
an electric light source comprising a lighting element, the electric light source removably couplable to, and configured for electrical communication with a plurality of charging platforms, the electric light source comprising first and second electric contacts disposed on a bottom surface;
a light source holder; and
a controller configured for wireless communication; and
a group charging station configured for electrical communication with a power source, the group charging station comprising the plurality of charging platforms, each charging platform configured for electrical communication with the group charging station, wherein:
at least one of the charging platforms comprises first and second charging contacts disposed on an upper surface, wherein the first charging contact is configured as a charging pin and the second charging contact is configured as a charging ring, the charging pin being disposed proximate the center of the charging ring;
when the charging pin is brought proximate the first electric contact, a magnetic attraction force between the charging pin and the first electric contact causes the charging pin to transition from a retracted position to an extended position such that, when in the extended position, the charging pin is in electrical communication with the first electric contact;
the first charging contact and the second charging contact have opposing magnetic polarities;
the light source holder is removably couplable to the electric light source such that when the electric light source is removably coupled to the light source holder, the electric light source and the light source holder share a central axis and the first charging contact contacts the first electric contact and the second charging contact contacts the second electric contact;
contact between the first charging contact and the first electric contact allows electrical communication between the first charging contact and the first electric contact, and contact between the second charging contact and the second electric contact allows electrical communication between the second charging contact and the second electric contact;
the electric light source comprises a top surface, at least one magnet disposed on an underside of the top surface, and at least one guide disposed thereon, the at least one guide positioned between (i) inner and outer perimeters of the top surface and (ii) first and second angular positions, the second angular position being a first clockwise distance from the first angular position, the at least one magnet positioned (a) between inner and outer perimeters of the underside of the top surface and (b) at a third angular position proximate to the first or second angular positions;
at least one of the plurality of lighting modules is configured to receive commands through at least one of the charging platforms, the commands indicative of a user selection of a particular lighting mode to at least one lighting module of the plurality of lighting modules; and
the primary lighting module is configured to:
operate the lighting element of the primary lighting module in accordance with the particular lighting mode; and
transmit the commands to the at least one secondary lighting module.

13. The electric lighting system of claim 12, wherein the group charging station is one of a plurality of group charging stations, the plurality of group charging stations being incorporated into a mobile transport.

14. The electric lighting system of claim 12, wherein the lighting mode comprises (i) a first variable selected from the group consisting of high intensity, medium intensity, and low intensity and (ii) a second variable selected from the group consisting of flicker and constant.

15. The electric lighting system of claim 14, wherein flicker simulates a flicker flame.

16. An electric lighting system comprising:
a plurality of lighting modules, each lighting module of the plurality of lighting modules comprising:

an electric light source comprising a lighting element, the electric light source removably couplable to, and configured for electrical communication with a plurality of charging platforms, the electric light source comprising first and second electric contacts disposed on a bottom surface;

a light source holder removably couplable to the electric light source; and a controller configured for wireless communication; and a group charging station comprising:

the plurality of charging platforms, each charging platform configured for electrical communication with the group charging station, and wherein each electric light source is configured for electrical communication with Han each charging platform; and a master controller configured to (i) receive user input indicative of a user selection of a particular lighting mode and (ii) transmit, through the plurality of charging platforms, commands indicative of the user selection of the particular lighting mode to at least one lighting module of the plurality of lighting modules, wherein:

at least one of the charging platforms comprises first and second charging contacts disposed on an upper surface;

the first charging contact and the second charging contact have opposing magnetic polarities;

the light source holder is removably couplable to the electric light source such that when the electric light source is removably coupled to the light source holder, the electric light source and the light source holder share a central axis and the first charging contact contacts the first electric contact and the second charging contact contacts the second electric contact;

when the charging pin is brought proximate the first electric contact, a magnetic attraction force between the charging pin and the first electric contact causes the charging pin to transition from a retracted position to an extended position such that, when in the extended position, the charging pin is in electrical communication with the first electric contact;

contact between the first charging contact and the first electric contact allows electrical communication between the first charging contact and the first electric contact, and contact between the second charging contact and the second electric contact allows electrical communication between the second charging contact and the second electric contact; and the electric light source comprises a top surface, at least one magnet disposed on an underside of the top surface, and at least one guide disposed thereon, the at least one guide positioned between (i) inner and outer perimeters of the top surface and (ii) first and second angular positions, the second angular position being a first clockwise distance from the first angular position, the at least one magnet positioned (a) between inner and outer perimeters of the underside of the top surface and (b) at a third angular position proximate to the first or second angular positions.

* * * * *